United States Patent
Mariblanca Nieves (10) Patent No.: US 8,428,072 B2
(45) Date of Patent: Apr. 23, 2013

(54) METHODS AND APPARATUS FOR ADVERTISING A ROUTE FOR TRANSMITTING DATA PACKETS

(75) Inventor: David Mariblanca Nieves, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 266 days.

(21) Appl. No.: 12/993,547

(22) PCT Filed: May 20, 2008

(86) PCT No.: PCT/EP2008/056157
§ 371 (c)(1),
(2), (4) Date: Nov. 19, 2010

(87) PCT Pub. No.: WO2009/140997
PCT Pub. Date: Nov. 26, 2009

(65) Prior Publication Data
US 2011/0069713 A1    Mar. 24, 2011

(51) Int. Cl.
*H04L 12/28* (2006.01)
*H04L 12/56* (2006.01)

(52) U.S. Cl.
USPC .......................................... 370/400; 370/392

(58) Field of Classification Search .............. 370/389, 370/392, 400
See application file for complete search history.

(56) References Cited

U.S. PATENT DOCUMENTS

| | | | |
|---|---|---|---|
| 7,969,997 B1 * | 6/2011 | Noh et al. | 370/408 |
| 7,983,691 B1 * | 7/2011 | Wong et al. | 455/456.1 |
| 2003/0140165 A1 * | 7/2003 | Chiu et al. | 709/238 |
| 2005/0113086 A1 * | 5/2005 | Wilson | 455/432.2 |
| 2006/0176819 A1 * | 8/2006 | Charzinski et al. | 370/238 |
| 2008/0031187 A1 | 2/2008 | Draves et al. | |

FOREIGN PATENT DOCUMENTS

| WO | WO 2006/126924 A | 11/2006 |
|---|---|---|
| WO | WO 2006/126924 A1 | 11/2006 |

OTHER PUBLICATIONS

Moy, J. OSPF Verison 2. Network Working Group; Request for Comments: 2328. Apr. 1998.

* cited by examiner

*Primary Examiner* — Ronald Abelson
(74) *Attorney, Agent, or Firm* — Coats & Bennett, P.L.L.C.

(57) ABSTRACT

Method and apparatus for advertising a route for transmitting data packets in a network. A first network element obtains a metric indicative of a cost for routing packets from the first network element to a second network element. The first network element compares the obtained metric with a metric received in a route advertisement message advertising a second route towards the second network element. The first network element sends route advertisement messages, advertising a first route towards the second network element through said first network element, only if the obtained metric indicates a lower cost than a received metric. When two or more network elements are advertising routes towards the same destination, the invention provides a solution allowing an optimized usage of transmission resources between these network elements and said destination.

15 Claims, 3 Drawing Sheets

METHODS AND APPARATUS FOR ADVERTISING A ROUTE FOR TRANSMITTING DATA PACKETS

FIELD OF THE INVENTION

The present invention relates to method, apparatus and computer program for advertising a route for transmitting data packets in a network.

BACKGROUND

Communications in most of today's communications networks are accomplished by transmitting formatted blocks of data, commonly know as "data packets". Data packets are transmitted between network elements, which act as originating and/or final destination endpoints, and commonly traverse other network elements that route the packets towards their respective destination. Application servers and user terminals are examples of network elements acting as originating and/or final destination endpoints; and routers, firewalls, Local Area Network LAN switches, protocol gateways, etc, are examples of network elements routing data packets from one endpoint towards another endpoint.

Network elements routing packets are usually configured with routing information for determining the next network element where to send a received packet, usually known as "next hop". A path through a network for sending packets towards a given network element is commonly known as "route", and the routing information referred above is commonly known as "routing tables".

Routing tables in a network element, either: referred to routes held by said network element, or to routes held by others; can be configured statically (e.g. the so called "static routes", configured via operation and maintenance commands) and/or dynamically ("dynamic routes"). In the latest case, dynamic data in the routing table of a network element are configured by using route advertising protocols. Examples of these protocols are: "Open Shortest Path First" (OSPF), "Intermediate system to Intermediate System" (IS-IS), or Border Gateway Protocol (BGP).

By using a route advertising protocol, a network element, such as a router routing Internet Protocol (IP) packets, advertises the route(s) it handles towards some destination(s) (commonly, statically configured in said network element), and is dynamically acquainted with the routes held by other network elements towards some other destination(s). This is accomplished by sending route advertisement messages comprising identifiers related to the sending network element (e.g. a router) and the destination(s). Accordingly, dynamic entries in a routing table of a network element, referred to routes held by others, can be added and/or modified according to the content of route advertisement messages received from other network elements.

Dynamic entries in a routing table can also be deleted/modified according to further content of route advertisement messages received from other network elements. For example, in OSPF a field called "Link-State-Advertisement" (LSA) is used. The LSA age information of a given route entry in a routing table can be used to delete said route when it becomes too old; for example when the same route is not re-advertised by the same network element in a given time (e.g. a typical time is when the LSA of a OSPF advertised route becomes half an hour old).

Other data type can be stored in an entry of a given route comprising information indicative of a cost (usually related to factors such as time delay, quality of service, maximum theoretical bandwidth, reachability, etc) for routing a packet trough said route towards its destination. Such information is usually known as "metric", and said term shall be used across the present application to refer to said information.

In the routing table of a given network element, the metric information associated to a given static route it holds, and eventually advertises, is usually configured statically, e.g.: via operation and maintenance, O&M, commands. Information about the metric of a route held by a given network element can be included in a route advertisement message sent from said network element to other network elements. Accordingly, for routes advertised by others, the routing table of a given network element can comprise (dynamic) information according to the received advertised metrics.

The features provided by today's communication protocols and data packet transmission technologies make possible the interconnection of a huge number of different (sub)networks, which can belong to different network domains (e.g. network infrastructures belonging to different organizations that can be spread across different geographical locations), wherein a plurality of network elements arranged for routing packets provide a "mesh" allowing the establishment of communications between other network elements acting as information endpoints. These features have permitted the deployment of a high variety of applications, which give rise to a plurality of business opportunities, but, on the other hand, put some strong demands on the transmission infrastructure and resources of the communications networks in terms of: speed, resiliency, quality, etc.

In the meshed interconnection scenario described above, it can be usual that the path of a data packet, sent from an originator endpoint towards a destination endpoint, traverses a plurality of network elements routing packets, wherein some of them can be used as an alternative to others for transmitting the data packet towards its destination, as defined by the corresponding routing tables stored in these network elements. In other words, in complex communications networks (which can involve intranets and the internet) data packets towards a given network element can be sent through alternative routes, some of which does not necessarily always involve the intervention of the same intermediate network element(s) routing the packets. This provides resiliency (e.g. in case a network element routing packets becomes unavailable), and also helps to distribute packet data traffic across available network elements.

In case a network element routing packets finds more than one (alternative) route for sending a received packet, a selection criterion, among others, comprises selecting a suitable route on its routing tables that implies the lowest routing cost, if more than one are available. Therefore, in order to achieve an optimized usage of the transmission resources of a communications network, it is of an outmost importance that dynamic data in the routing table of a network element routing packets, referred to routes held by others towards a given destination, contain the appropriate information, so as to achieve said goal.

SUMMARY

The invention provides, in different aspects, a method, an apparatus and a computer program as claimed in the independent claims. Embodiments of the invention are set out in the dependent claims.

According to aspects of the invention, a first network element obtains a metric indicative of a cost for routing packets, via a first route, from the first network element to a second network element. The first network element compares the obtained metric with a metric received in a route advertisement message advertising a second route towards the second network element. The first network element advertises the first route towards the second network element only if the obtained metric indicates a lower cost than a received metric.

The features above cause that only routes with lower metrics towards a certain destination are advertised. Therefore, when data in routing tables are dynamically updated based on information received in route advertisement messages from certain network elements, these features allow an optimized usage of the transmission resources existing between these network elements and said destination.

According to an embodiment, the process of obtaining a metric in the first network element comprises receiving a configuration command in said network element comprising a metric. According to a further embodiment, the process of obtaining a metric in the first network element comprises: sending a probe data packet from the first network element towards the second network element for calculating a metric based on: a transmission time value, a number of hops value, a link quality value, or combination thereof. According to alternative realizations, probe packets can be sent periodically, and as a result of executing by the first network element a TRACEROUTE or a PING command addressing the second network element.

According to a further embodiment, an obtained metric or a received metric can comprise a first and a second information element. The first information element comprising information relative to a magnitude of a cost for routing a packet to the second network element, and the second information element comprising information relative to a unit type in which said cost is measured. In a possible realization, the unit type comprises information indicating that the first information element provides a metric magnitude/value based on, among other: a number of hops, a transmission time value, a link quality value, a link type value, or combination thereof.

Information about metrics conveyed in route advertisement messages is thus enriched with information about the criteria/unit used to measure the indicated metric magnitude/value. According to further embodiments, this makes possible for a network element to: compare values of obtained metrics with metrics received in route advertisement messages having equal unit types, and/or adapt an obtained metric according to the unit type indicated in a received metric before comparing, and/or adapt a received metric according to the unit type indicated in an obtained metric before comparing, and/or send a route advertisement message comprising an obtained metric adapted in unit type to the unit type of a metric received in a route advertisement message.

According to a further embodiment, the process of adapting in a network element an obtained metric according to a received metric comprises: selecting the unit type indicated in a majority of received route advertisement messages, and adapting the obtained metric accordingly. This feature makes possible for network elements advertising routes to converge into common unit(s) used to measure and advertise metrics indicative of cost for routing packets, which makes the route advertising process more efficient, given that most of the network elements will consequently tend to advertise, and compare, metrics values of the same nature.

According to a further embodiment, the first network element (re)starts a timer at reception of a route advertisement message advertising a second route towards the second network element indicating a lower cost than its own obtained metric towards said second network element. At time-out of said timer, the first network element (re)start advertising the first route towards said second network element. In a possible realization, the timer can be set according to a time value contained in a received route advertisement message. Resiliency of the network is thus not prejudiced by the fact that, for optimizing transmission resources, an alternative route towards a certain destination is not advertised from certain network element(s), given that, in case of failure of a network element advertising a route with a lower metric, another one could then (re)advertise a route towards the same destination.

According to further embodiments of the invention, the protocol for advertising a route is: Open Shortest Path First OSPF, or Intermediate system to intermediate system IS-IS, or Border Gateway Protocol BGP.

DETAILED DESCRIPTION

Exemplary embodiments of the invention shall now be described with reference to FIGS. 1 to 4.

Figure 1:
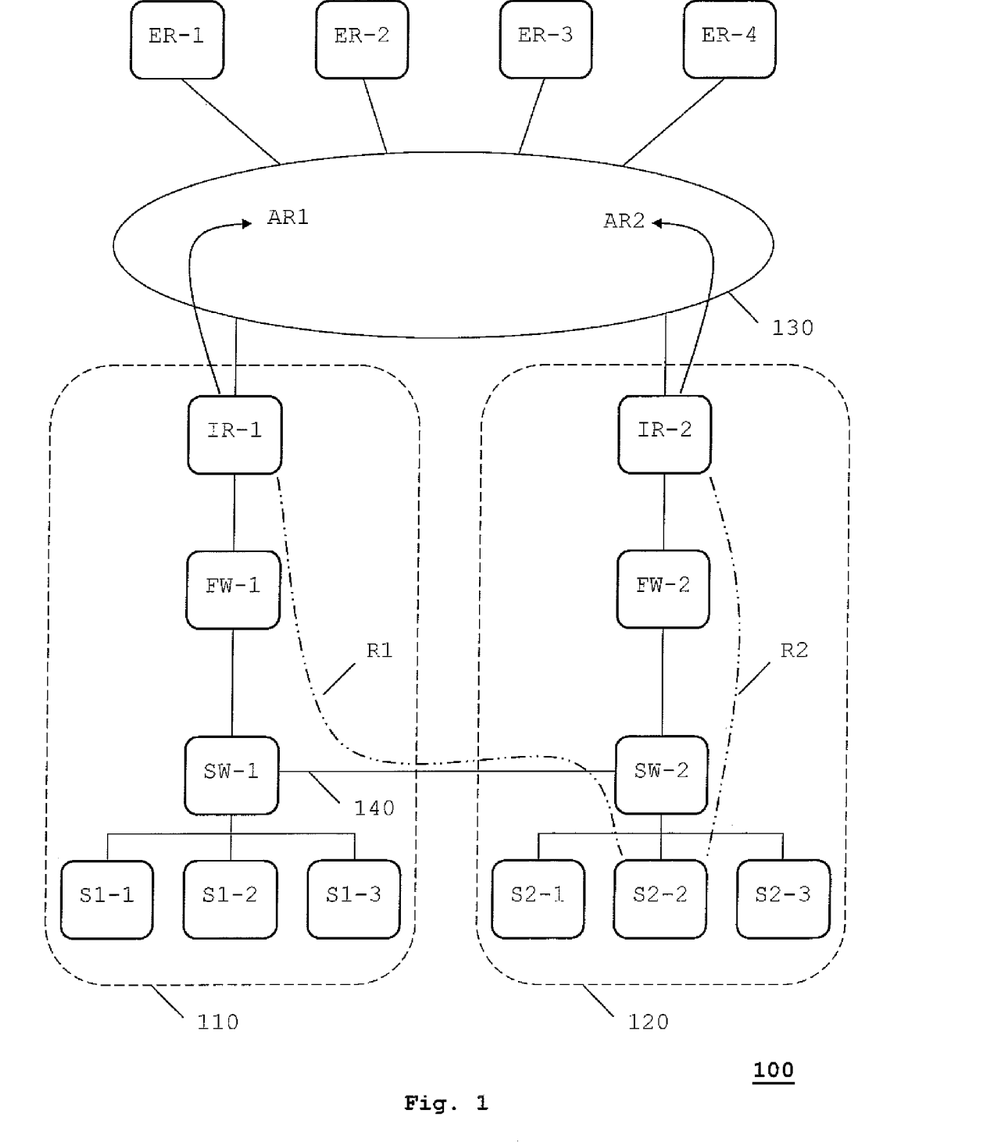
FIG. 1 shows a simplified view of a communications network to illustrate a problem of the prior-art and an embodiment of the invention.

FIG. 1 shows schematically a communications network 100, illustrating with more detail the internal structure of two network infrastructures, 110 and 120, of different sites.

On the first site 110 there are illustrated three network elements acting as information endpoints, referred as: S1-1, S1-2 and S1-3. Second site 120 is also illustrated having three network elements acting as information endpoints, referred as: S2-1, S2-2 and S2-3. These endpoints can, for example, be application server machines some of which can, e.g., act as redundant servers of servers on the other site. By way of example, sites 110 and 120 can be assumed to belong to the network domain of a service provider, telecommunications network operator, etc.

Site 110 comprises a LAN switch SW-1, which facilitates network connectivity to servers: S1-1, S1-2 and S1-3; and site 120 comprises LAN switch SW-2 providing similar functions to servers: S2-1, S2-2 and S2-3. Externals communications of these servers with network elements located in other sites, such as external application servers, user terminals, etc (not detailed in FIG. 1), are held by internal routers IR-1 and IR-2, which are connected through one or more inter-connection network 130, to routers ER-1 to ER-4, external to sites 110, 120. For example, there can be similar "site" structure behind any of the routers ER-1 to ER-4, as the one shown in FIG. 1 for sites 110 or 120. Firewalls FW-1 and FW-2 takes care of filtering data packets related to external communications.

Link 140 provides for direct inter-site communications between servers (S1-1 ... S2-3) in both sites, and also allows external communications redundancy, which can be used, for example, when any of the internal routers IR-1, IR-2 becomes unavailable. Also, when some of the servers in one site (e.g. S1-1) is redundant to some other server on the other site (e.g. S2-1), the topology shown in FIG. 1 provides a high-availability, since, for example, if IR-1 becomes unavailable, traffic related to these servers can still be routed trough router IR-2. Therefore, an optimized usage of a network resource such as the inter-site link 140 is essential, as inter-sites and externals communications depend on its availability.

Given that the internal topology of a sub-network, such as sites 110 or 120, are usually known to a network administrator, (internal) routes between internal network elements use to be configured statically. By using the illustration in FIG. 1 by way of example, static route information is configured in router IR-1 to reach server S1-1, S1-2 or S1-3, which establishes that the next hop for sending a packet towards said server is the firewall FW-1. Similarly, router IR-2 is configured with static information on its routing tables, so that the next hop for routing a packet towards server S2-1, S2-2 or S2-3 is firewall FW-2. As, given the illustrated kind of topology, both routers (IR-1 and IR-2) can act as an alternative to each other for external communications, a further static routing configuration is usually established in these routers. Accordingly, router IR-1 gets configured with FW-1 as next hop for routing an incoming packet towards any of network elements S2-1, S2-2 or S2-3. In a similar way is configured IR-2 with regard to network elements S1-1, S1-2 or S1-3, which determines FW-2 as the next hop for these destinations.

As opposed, the external network topology beyond a local site (e.g. sub-networks behind any of the external routers ER-1 TO ER-4, as well as of interconnection networks), are usually not known to the network administrator of, e.g., site 110 or 120. There, the dynamic routing information obtained by means of route advertisement protocol messages is of a significant advantage. By using route advertisement messages, routers IR-1 or IR-2 can get acquainted with the routes held by, e.g., external router ER-1 towards a given network element behind said router (not shown in FIG. 1), as well as router ER-1 can get acquainted with the route(s) held by IR-1 or IR-2 towards network elements (S1-1 ... S2-3) in sites 110, 120. With regard to routing information advertised for, e.g., server S1-1, and according the illustrated scenario, router IR-1 will advertise a first route towards said server, and IR-2 will advertise a second route towards said server. This can be accomplished by sending from routers IR-1 and IR-2 route advertisement messages according to a protocol such as OSPF towards external routers ER-1 ... ER-4. The advertisement of a dynamic route (e.g. a route advertised by IR-1 towards S1-1 through IR-1, or by IR-2 towards the same destination but through IR-2) is repeated periodically, so that the receiver(s) of the route advertisement get aware that the route, as advertised, is still available.

When receiving route advertisement messages, any of the external routers (ER-1 ... ER-4) updates their dynamic routing entries accordingly. As a result, a given external router (e.g. ER-1) gets dynamically configured so that, if receives a data packet addressing to, e.g. server S1-1, it can send it towards its destination by using IR-1, or IR-2, as the next hop. Information in route advertisement messages can also comprise a metric indicative of a cost for routing a packet towards a destination advertised therein. In scenarios such as the one illustrated by FIG. 1, internal routers (IR-1, IR-2) use to be manually configured with these metrics. For example, considering the illustrated topology, and taking into account that the inter-site link 140 is an essential resource, router IR-1 preferably advertises towards external routers (ER-1 ... ER-4) a lower metric in a route towards server S1-1 than the metric advertised by router IR-2 towards said server.

However, this mechanism does not ensure that data packets of external communications addressed to server S1-1 are always received by router IR-1, nor that similar packets addressed towards server S1-3 are always received by router IR-2.

The reason is that, commonly, routers also maintain (static and/or dynamic) metric values with regard to cost for routing packets towards directly, or indirectly, connected further routers. For example, in OSPF protocol LSA "type 1" can be used among meshed routers to advertise themselves and their respective metric towards other routers. This can cause that, for example, even a first route towards S1-1 is advertised by IR-1 with a lower metric (i.e. lower cost) than the one advertised by IR-2 towards the same server S1-1, an external router (e.g. ER-2) can consider that the cost for reaching IR-1 is higher than the cost for reaching IR-2, and it is not balanced by the advertised (lower) metric received from IR-1. As a result, and regardless router IR-1 can be up and running and advertising a route towards S1-1 with a lower metric, a data packet received by, e.g., ER-2 and addressed to S1-1, can be sent to IR-2; thereby causing an undesired usage of inter-site link 140. Therefore, the metric advertised by routers IR-1 or IR-2 can not ensure a proper/desired usage of network resources of sites 110, 120.

Figure 2:
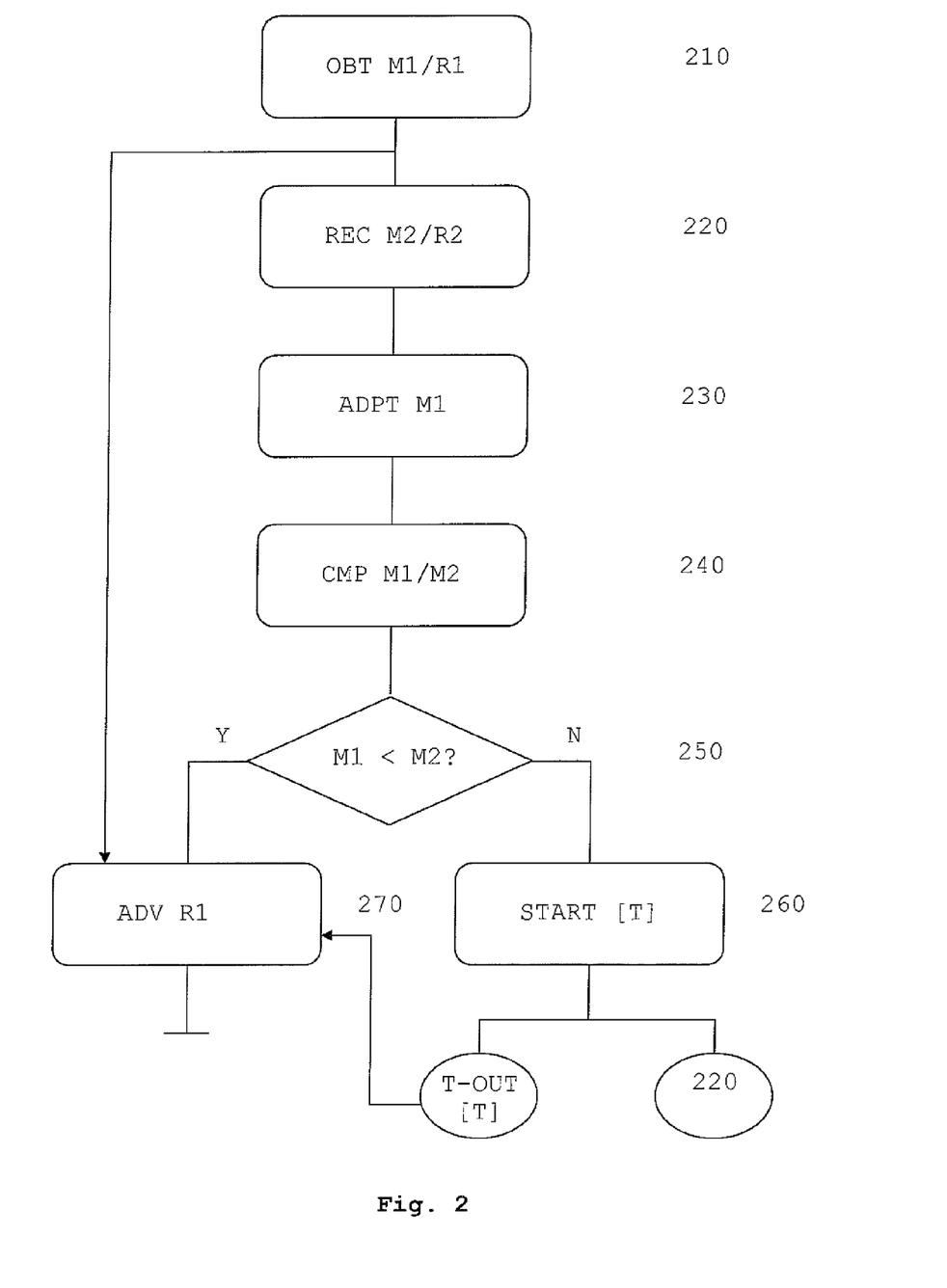
FIG. 2 shows a flowchart illustrating some steps of a method according to embodiments of the invention.

FIG. 2 shall be used to illustrate steps of a method according to some embodiments of the invention. References to elements illustrated in FIG. 1 shall be used for the sake of clarity.

In step 210 a network element transmitting data packets, such as router IR-1, obtains a metric (M1) indicative of a cost for routing a packet towards a given network element within site 110 or 120.

Given the topology described in the example of the FIG. 1, router IR-1 can, as described earlier, be statically configured with regard to internal routes and metrics towards network elements: S1-1, S1-2, S1-3, S2-1, S2-2 and S2-3. For a clearer understanding of the embodiments of the method illustrated in FIG. 2, step 210 can represent, for example, the configuration of the metric of a given route (R1) in IR-1 towards S2-2 via O&M command.

Also, according to an advantageous embodiment of the invention, part or all of the metric M1 obtained in step 210 can comprise the use of a dynamic method. One possible alternative is by sending (e.g. periodically) probe data packets towards a network element destination of said route. In the illustrated example, this can be accomplished by executing (e.g. periodically) "TRACEROUTE" or "PING" commands in IR-1 addressing S2-2, which would provide IR-1 information about the number of interposed network elements, and/or information about a transmission time between them. By sending probe packets frequently, a metric towards a given network element trend to contain a reliable value.

The metric information of a route held by a given network element (e.g. IR-1) can comprise also information that, implicitly, indicates a cost for routing packets, such as information about link quality (e.g. statically configured, or dynamically measured), or link type (e.g.: physical characteristics, such as if optical link or not, or theoretical maximum bit rate, etc). Although not illustrated in FIG. 2 for simplicity, step 210 can be repeated at certain time intervals.

Once an internal route (e.g. R1, between IR-1 and S2-2) is, or has been, configured, it can be advertised dynamically, for example, by flooding a route advertisement message according to a suitable protocol, such as OSPF. Step 270 represents the sending of route advertisement message(s) AR1 by IR-1 about route R1 and comprising part or all of the metric M1 obtained in step 210. Other routers can perform similar steps, and the corresponding route advertisement messages be received by IR-1, so as to update dynamic routing entries on its tables referred to routes held by others. For example, step 220 can comprise the reception by IR-1 of a route advertisement message AR2 from IR-2 advertising its (internal) route R2 towards network element S2-2, and comprising metric M2.

Router IR-1 verifies that the route destination of R2, advertised in message AR2, is server S2-2, for which IR-1 holds also a route (R1), and the execution can then proceed in IR-1 by comparing, on step 240, the received metric M2 with the obtained (step 210) metric M1 towards said destination. As illustrated in FIG. 2, this can be preceded (but not necessarily) by an adaption step 230, which shall be later detailed.

If, on step 250, the obtained metric M1 implies a lower cost than the received metric M2, IR-1 continues advertising its own route R1, as illustrated by the transition to step 270. Otherwise (what could be the real case, given the topology represented in FIG. 1), IR-1 stops doing said advertising, which, as described earlier, will cause its advertised information become discarded by other routers after a certain time. As a result, further incoming packets addressing server S2-2 will be routed through router IR-2, instead of being routed through IR-1; thereby minimizing the usage of inter-site link 140 due to external traffic and, thus, optimizing the eventual direct inter-site communications, which trend to be more frequent in some cases.

A further advantageous feature is provided by a method according to the invention, wherein resiliency of the network is not prejudiced by the fact that an alternative route towards a certain destination is not advertised from certain network element(s), such as route R1 from router IR-1.

If, as a result of the execution of step 250, IR-1 stop advertising route R1, a timer T can be started therein in relationship with routes towards the same destination (S2-2), as illustrated by transition to step 260. The timer can be stopped at reception (220) of a route advertisement message, which would be processed in IR-1 as described heretofore, and which could derive into a new (re)start of the timer in case the checked conditions (steps 240, 250) cause IR-1 to keep without advertising route R1. Otherwise, at time-out of timer T, router IR-1 would (re)start advertising its route R1, as illustrated by transition to step 270. Accordingly, in case of failure of IR-2, communications towards server S2-2 would not be permanently affected, since IR-1 would then (re)advertise route R1 towards the same destination (S2-2).

The metric cost information obtained and advertised by routers in a network can diverge. In other words, the criteria used to measure it can vary. An advantageous feature of the invention addressing this issue shall now be described.

For example, the metric M1 obtained by router IR-1 can comprise two information elements. The representation of these information elements, e.g. in terms of data structure for its storage and/or its transmission is not relevant for accomplishing with its purpose. For example, any or both can comprise alphanumeric values. The first information element is intended to convey a value expressing merely a magnitude of the metric, wherein the second information element is intended to convey information about the unit, or unit type, in which the magnitude of the first information element is expressed. Accordingly, if e.g. the first information element contains a value such as "5", the second information element could, for example, comprise: a value "1", which could be established to represent number of 5 hops, or a value "2" to indicate a time of e.g. 5 milliseconds, or a value "7A" to indicate a link quality or a link type of 5, etc. The metric obtained (e.g. step 210), advertised (e.g. step 270) or received (e.g. step 220) by a network element can comprise a plurality of first and second information elements as described herein. As cited above, router IR-1 can be manually configured with information about these metrics for routes it handles (such as R1) and/or can get some of the necessary data dynamically, as described above.

Step 230 represents an advantageous embodiment of the invention, wherein an obtained metric M1 is adapted according to a received metric M2. In a simple realization, this step can comprise discarding a received metric, and thus, avoid further steps (240, 250), if the unit type of a received metric does not match the unit type of an obtained metric. More complex realizations comprise transforming an obtained metric according to unit type indicated in the received metric, or vice-versa. For example, router IR-1 can be configured with a pre-defined equivalence between "number of hops" and other unit type, such as: "transmission time", "link quality", etc; so that, it can transform, before executing step 240, a received metric M2 indicating transmission time to a received metric M2 comprising a number of hops, or transform its obtained metric M1 accordingly.

Adaptations made in step 230 can be used in router IR-1 so as to include the adapted obtained metrics (e.g. M1) for own routes (e.g. R1) in further route advertisement messages sent by IR-1 (step 270). Therefore, router IR-1, if configured accordingly, can align the metric indicated on its advertisement messages according to the metric advertised by other router, which might not be configured to adapt a metric. Also, router IR-1 can be configured to obtain different kind of metrics for the same route (e.g. R1), wherein the step of adapting (230) comprises the step of selecting an obtained (210) metric type M1 which matches a received (220) metric type M2.

Moreover, the method of the invention can further comprise the steps (not shown in FIG. 2) of: collecting the unit type indicated by a plurality of received route advertisement messages, and selecting a unit type, so that it is the unit type indicated in the majority of route advertisement messages received by IR-1 in a given time. Accordingly, the step of obtaining (210), when executed a subsequent time (not shown in FIG. 2), can comprise the obtainment of a metric adapted as described above.

This feature makes possible for network elements advertising routes to converge into common unit(s) used to measure and advertise metrics, which makes the route advertising process more efficient, given that most of the network elements will consequently tend to advertise metrics values of the same nature, which could then be properly compared in steps 240-250.

An advantageous embodiment in relationship with the timing process described earlier with reference to step 260, and subsequent, shall now be described with reference to FIG. 3.

According to embodiments of the invention described hereinbefore, when two or more routers are advertising a route towards the same destination, one or more of them can withdraw said advertisement during a certain lapse of time (e.g. timer "T" started on step 260). However, the impact of said withdrawal in the availability of routing resources on the network should be preferably minimized.

Figure 3:
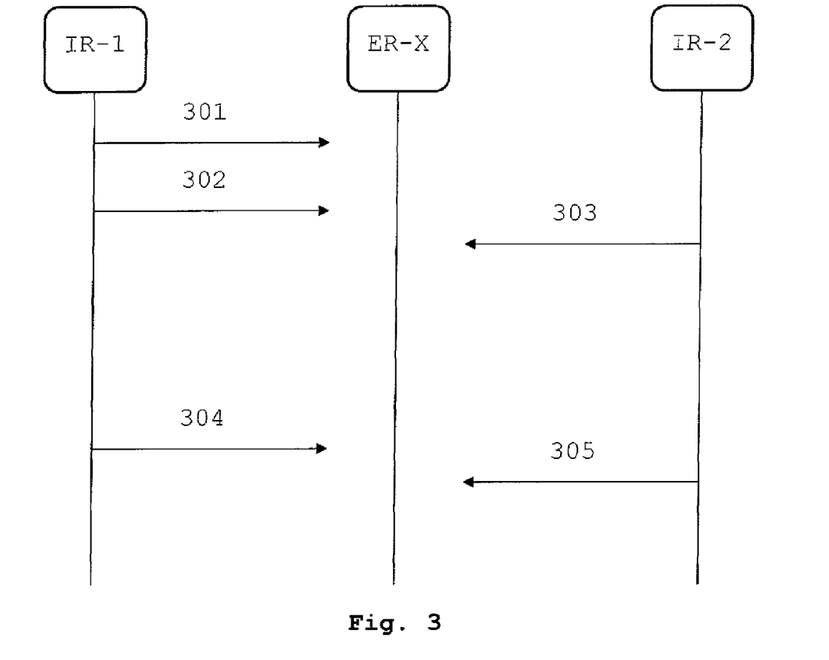
FIG. 3 shows a simplified signaling flow among entities shown in FIG. 1 according to embodiments of the invention.

FIG. 3 illustrates a case in which routers IR-1 and IR-2 inject some routes towards other network elements by sending route advertisement messages (illustrated signaling flows) towards other network elements, e.g. according to OSPF protocol. External routers shown in FIG. 1 are schematically represented by ER-X. The contents of flows illustrated in FIG. 3, which are relevant for understanding this embodiment, are listed below:

Flow 301: IR-1 advertises it holds a route towards server S2-3. Metric is 34 msec. LSA Age 3598.

Flow 302: IR-1 advertises it holds a route towards server S1-1. Metric is 4 msec. LSA Age 3598.

Flow 303: IR-2 advertises it holds a route towards server S2-3. Metric is 2 msec. LSA Age 3598.

Flow 304: IR-1 advertises it holds a route towards server S1-1. Metric is 4 msec. LSA Age 0.

Flow 305: IR-2 advertises it holds a route towards server S2-3. Metric is 2 msec. LSA Age 3598.

After flows 301 to 303 have been flooded, an external router ER-X (such as router ER-2) will have stored the following dynamic routing information with regards to routes available towards servers S1-1 and S2-3:

S2-3: route through IR-1; Cost=34+cost of link towards IR-1.

S2-3: route through IR-2; Cost=2+cost of link towards IR-1.

S1-1: route through IR-1; Cost=4+cost of link towards IR-1.

As described above, the external router calculates the cost of routing a packet towards a given destination (e.g. S1-1) by adding metric cost information received from the advertising router (e.g. IR-1) and adding its own stored metric cost towards said router. This latest added cost is obtained, for example when using OSPF, by exchanging also route advertisement messages with LSA Type "1", which is the LSA used by the routers for advertising themselves to other neighbor routers.

Also, once flows 301 to 303 have been flooded, both: IR-1 and IR-2, knows they are advertising different routes related to the same destination S2-3. As described with reference to the method illustrated in FIG. 2, router IR-1 compares its obtained metric (34) versus the received metric (2), advertised by IR-2, and, since the advertised metric is lower, it stop advertising the route towards S2-3. Router IR-2 instead continues (re)advertising its route towards S2-3, as illustrated by flow 305. Router IR-2 can behave in such a way because it also implements the method of the invention, or because simply behaves as in the prior-art (i.e. not comparing metrics for determining whether advertise or not a route).

In the illustrated example, the route advertised by IR-1 in flow 302 (with S1-1 as destination) is not affected, as it is not advertised by any other router with a lower metric. Therefore, IR-1 continues advertising it periodically, as illustrated by flow 304.

An important factor in all these flows is the LSA Age field. For example, for a clearer understanding of this embodiment it is assumed that, at the beginning, none of the routers IR-1 and IR-2 hold, respectively, routes towards any destination that could be common. Accordingly, route advertisement messages flooded in flows 301, 302 and 303 comprise a very high value in the LSA Age field. As explained earlier with reference to the prior-art, this would cause the corresponding route become—say—old in a receiver router (e.g. ER-X) if it is not re-advertised in a very short time (two seconds in the example). Once—say—"colliding" routes have been determined towards the same destination S2-3, the next (re)advertisement of the route (flow 305) is also sent with a short LSA Age field, and with a short time from the previous flooding (flow 303), so as to ensure the information of this route advertised by IR-2 is not discarded by other routers for being too old. As opposed, the route towards S1-1 advertised by IR-1 in flow 302 is not detected as "colliding" (i.e. not advertised by any other router), and the next (re)advertisement of said route (flow 304) comprises a longer LSA Age field (zero, in the illustrated example). In summary a "colliding" route is, preferably, re-advertised by the router which keep doing so more frequently than a "non-colliding" route.

These timing adjustments in LSA Age field achieve, on the one hand the network (nor the receiving routers) to be overloaded unnecessarily with too frequent re-advertisements of the same routes (i.e. for the "non-colliding" ones), and, on the other hand permits an early detection of an eventual failure in a router. Accordingly, in the illustrated case, if IR-2 does not send a new route advertisement message concerning server S2-3 (i.e. subsequent flow to 305, not shown in FIG. 3), then a time-out would occur in IR-1 (e.g. as explained with reference to FIG. 2) which would cause IR-1 to (re)start advertising its own route towards S2-3. Nevertheless, the setting of the referenced timer in IR-1 can be adjusted independently of the received LSA Age field.

Figure 4:
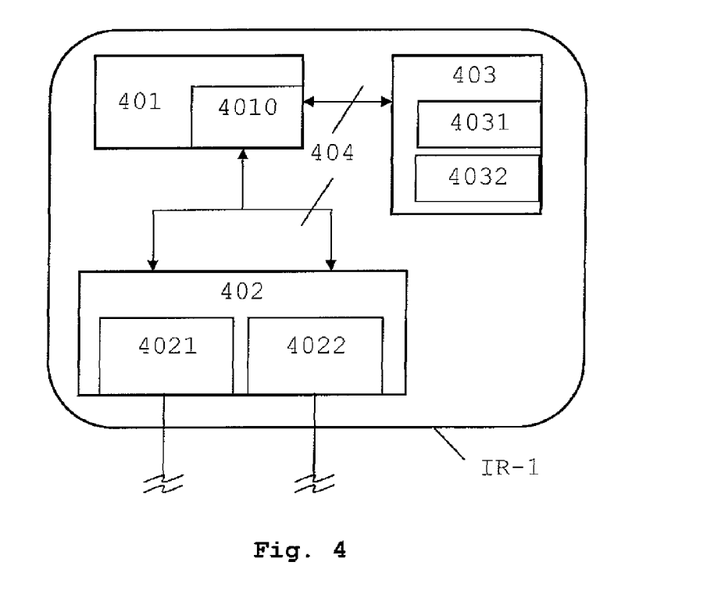
FIG. 4 shows a schematic representation of some functional modules of an apparatus for transmitting data packets in a network according to an embodiment of the invention.

FIG. 4 illustrates a schematic representation of some functional modules of an apparatus for transmitting data packets in a network, such as router IR-1, according to an embodiment of the invention. The embodiment considers an implementation as a computer-based apparatus.

This preferred (computer-based) embodiment has been selected for illustration since, nowadays, most of the network elements intervening in data network are implemented as apparatuses comprising combination of hardware and software for controlling its operation. Sometimes, the total functionality of a network element, such as a router or a server, can be distributed among various physical machines, which cooperate to accomplish with the total functionality said network element is assigned to perform. For simplicity, the alternative of a single physical machine is illustrated in FIG. 4 for router IR-1.

A network element, such as IR-1, can, regardless specific construction details, be considered as an apparatus comprising one or more functional modules; each of them arranged to perform a specific (sub)function of the total functionality implemented by said entity. Once the functionality of said entity has been specified, the construction of the functional modules (being these comprised of software, hardware, or combination thereof) making up said entity, so to build up a realization of the corresponding physical machine(s), or its modification, is a matter of routine work for those skilled in the art. Accordingly, the description given herein with reference to FIG. 4 shall describe some functional components of network element arranged for transmitting received data packets in a network, and further adapted to accomplish with any of the embodiments described heretofore, without falling into specific hardware and software construction details, which are well known by those skilled and, consequently, which are not needed to understand the invention.

The simplified internal structure shown in FIG. 4 comprises: a processing module 401, a communications module 402, a data storage module 403 and internal communication buses 404 which allow data communication and cooperation between them. In general, when a certain content (e.g. a received data packet or a message) is to be sent, the processing module 401 requests the communications module 402 to send the content and provides it with the necessary information, and, when a certain content (e.g. a signaling message or a packet) is received by the communications module, it transfers the relevant information to the processing module for triggering the necessary processing. In turn, the processing module 401 accesses the data storage module 403 to store/update/check/obtain the necessary data for the operation.

The processing module 401 can comprise one or more processors (only one processor 4010 is shown in FIG. 4) which, for example, can be arranged to work in load-sharing or active-backup mode. The operation in router IR-1 is controlled by computer-readable program code comprising instructions that are executed by processor 4010. The execution of these instructions makes it to perform according to embodiments of the invention described before. As stated earlier, currently, most of the network elements are implemented by computer-based apparatuses. Accordingly, computer programs comprising computer-readable program codes are loaded in computer-based apparatuses causing them to behave according to a predefined manner, as determined by the respective program codes, which are in accordance to the specific functionality specified for the network elements these apparatuses implement. Thus, those skilled in creating and/or modifying computer programs, would, without departing of the teachings of the present invention, readily apply them to create and/or modify computer programs suitable to be loaded in a computer-based network element so as to make it to behave according to any of the described embodiments.

Communications with other network elements are performed via communications module 402, illustrated in FIG. 4 as comprising two communication devices 4021 and 4022. Depending on different implementation alternatives, a communication device can be suited to accomplish with one or more than one communication types (i.e. communications according to one or more communication protocols and/or signaling interfaces). For example, a communication device can be connected to inter-connection network 130, and other to transmission infrastructure of site 110. Also, some communication device(s) can be devoted to O&M configuration interfaces.

Data storage module 403 stores the data needed for the operation their respective separate operation. A data storage module in a computer-based apparatus can comprise one or more data storage devices. In the example illustrated in FIG. 4 it comprises storage devices 4031 and 4032. Memory chips and magnetic or optical discs are example of data storage devices. Depending on criteria such as data access speed for certain data, storage reliability, etc, the storage module of router IR-1 can comprise one or more storage devices of the same or different kind. Different modules of the storage module 403 can store, for example: the computer-readable program to be executed by processor 4010, its operational data (e.g. routing tables data), and temporary storage of received data packets which needs to be routed towards their respective destinations.

The invention has been described with respect to some exemplary embodiments in an illustrative and non-restrictive manner. Variations can be readily apparent to those of ordinary skill in the art. For this reason, the invention is to be interpreted and limited in view of the claims.

The invention claimed is:

1. A method of advertising a route for transmitting data packets in a network, the method comprising the steps of:
   obtaining in a first network element a metric indicative of a cost for routing a packet from the first network element to a second network element,
   sending from the first network element a route advertising message, the message advertising a first route towards the second network element through said first network element and including information of the obtained metric; and
   comparing the obtained metric with a metric received by the first network element in a route advertisement message advertising a second route towards the second network element, wherein the step of sending the route advertising message takes place if the obtained metric indicates a lower cost than the received metric;
   wherein the obtained metric and the received metric comprise a first and a second information element, each element comprising, respectively, information relative to a magnitude of a cost for routing a packet to the second network element, and a unit type in which the cost is measured, wherein the step of comparing comprises the step of comparing magnitudes of equal unit types.

2. The method of claim 1 wherein the second information element comprises an alphanumeric value indicating that the first information element expresses, at least one of: a number of hops, a transmission time, a link quality, a link type, or combination thereof.

3. The method of claim 1 further comprising the step of adapting an obtained metric according to the unit type indicated in a received metric, wherein the step of comparing comprises the step of comparing a received metric with the adapted obtained metric.

4. The method of claim 1 further comprising the step of adapting a received metric according to the unit type indicated in an obtained metric, wherein the step of comparing comprises the step of comparing the adapted received metric with the obtained metric.

5. The method of claim 1 further comprising the step of adapting an obtained metric according to the unit type indicated in a received metric, and wherein the step of sending the route advertising message comprises the step of including in the route advertisement message the adapted obtained metric.

6. The method of claim 3 further comprising the step of selecting the received metric, among a plurality of metrics received in route advertisement messages advertising routes towards the second network element, such that the unit type of the selected received metric is indicated in the majority of said received messages, wherein the step of adapting comprises the step of adapting according to the unit type indicating said selected received metric.

7. The method of claim 1 wherein the step of obtaining comprises receiving by the first network element a configuration command comprising a predefined metric.

8. The method of claim 1 wherein the step of obtaining comprises the step of sending a probe data packet from the first network element towards the second network element for calculating a metric based on; a transmission time value, a number of hops value, a link quality value, or combination thereof.

9. The method of claim 8 further comprising the step of executing in the first network element a PING command or a TRACEROUTE command addressing the second network element, wherein a probe packet is sent as a result of said execution.

10. The method of claim 8 wherein the step of sending a probe data packet is repeated periodically.

11. The method of claim 1 further comprising the steps of;
    starting a timer at reception by the first network element of a route advertising message advertising the second route towards the second network element, the route advertising message comprising a metric indicating a lower cost than the obtained metric, and
    sending from the first network element the route advertising message advertising the first route at time-out of said timer.

12. The method of claim 11 wherein the timer is set according to a time value contained in the received route advertising message.

13. The method of claim 1 wherein the protocol for advertising a route is: Open Shortest Path First, or Intermediate system to Intermediate System, or Border Gateway Protocol.

14. An apparatus for transmitting data packets in a network, the apparatus comprising a processor and a non-transitory memory in communication with said processor for storing instructions adapted to be executed by said processor to perform the steps of:
- obtaining in a first network element a metric indicative of a cost for routing a packet from the first network element to a second network element,
- sending from the first network element a route advertising message, the message advertising a first route towards the second network element through said first network element and including information of the obtained metric; and
- comparing the obtained metric with a metric received by the first network element in a route advertisement message advertising a second route towards the second network element, wherein the step of sending the route advertising message takes place if the obtained metric indicates a lower cost than the received metric;
- wherein the obtained metric and the received metric comprise a first and a second information element, each element comprising, respectively, information relative to a magnitude of a cost for routing a packet to the second network element, and a unit type in which the cost is measured, wherein the processor performs the step of comparing by comparing magnitudes of equal unit types.

15. The apparatus of claim 14, wherein the obtained metric and the received metric comprise a first and a second information element, each element comprising, respectively, information relative to a magnitude of a cost for routing a packet to the second network element, and a unit type in which the cost is measured, wherein the step of comparing comprises the step of comparing magnitudes of equal unit types.

* * * * *